(12) United States Patent
Upton et al.

(10) Patent No.: US 11,868,499 B2
(45) Date of Patent: Jan. 9, 2024

(54) PERMISSIONS—ENFORCED GRAPH DATABASE

(71) Applicant: Winter International, LLC, Lincoln, NE (US)

(72) Inventors: Clay T. Upton, Lincoln, NE (US); Neema Bahramzad, Lincoln, NE (US); Frace Marteja, Cainta (PH); Mark Matus, Cainta (PH)

(73) Assignee: Winter International, LLC, Lincoln, NE (US)

( * ) Notice: Subject to any disclaimer, the term of this patent is extended or adjusted under 35 U.S.C. 154(b) by 801 days.

(21) Appl. No.: 17/008,501

(22) Filed: Aug. 31, 2020

(65) Prior Publication Data

US 2022/0067191 A1 Mar. 3, 2022

(51) Int. Cl.
*G06F 16/901* (2019.01)
*G06F 16/9038* (2019.01)
*G06F 21/62* (2013.01)

(52) U.S. Cl.
CPC ...... *G06F 21/6227* (2013.01); *G06F 16/9024* (2019.01); *G06F 16/9038* (2019.01)

(58) Field of Classification Search
CPC ............. G06F 21/6227; G06F 16/9024; G06F 16/9038
See application file for complete search history.

(56) References Cited

U.S. PATENT DOCUMENTS

| | | |
|---|---|---|
| 7,392,264 B2 | 6/2008 | Lord et al. |
| 10,504,147 B1 | 12/2019 | Johnson et al. |
| 11,388,163 B2 * | 7/2022 | Bargury .................. H04L 63/10 |
| 2015/0033106 A1 * | 1/2015 | Stetson ............... G06F 16/9027 715/215 |
| 2016/0203327 A1 * | 7/2016 | Akkiraju ............. G06F 16/9024 707/785 |
| 2017/0221240 A1 | 8/2017 | Stetson et al. |
| 2018/0336364 A1 | 11/2018 | Haila et al. |
| 2019/0318068 A1 * | 10/2019 | Melo ....................... G06F 21/31 |
| 2019/0327271 A1 | 10/2019 | Saxena et al. |
| 2019/0384926 A1 * | 12/2019 | Wu ..................... G06F 21/6218 |

OTHER PUBLICATIONS

International preliminary report on patentability, PCT/US2021/040260, dated Feb. 28, 2023, pp. 1-7 (Year: 2023).*

* cited by examiner

*Primary Examiner* — Jorge A Casanova
(74) *Attorney, Agent, or Firm* — Chicago IP Law; Steven M. Evans

(57) ABSTRACT

An internally-constructed permissions graph database enabling a user to construct and alter the graph database permissions within the graph database. Edge permissions define whether a one node can View, Edit, or Manage another node. A node can view another node if there is at least one edge path connecting the nodes having a "View" permission. Similarly, a node can "Edit" or "Manage" another node if there is at least one edge path connecting the nodes having allowing "Edit" and/or "Manage" permissions, respectively. If a contiguous path of permission edges does not exist from the "caller node" to the "requested node" to be acted upon, then permission to perform the desired action or operation on that node is not granted. Edges have permissions, and Nodes have properties. A "Caller Node" makes Requests upon and "Requested Node," which are limited by edge permissions.

22 Claims, 8 Drawing Sheets

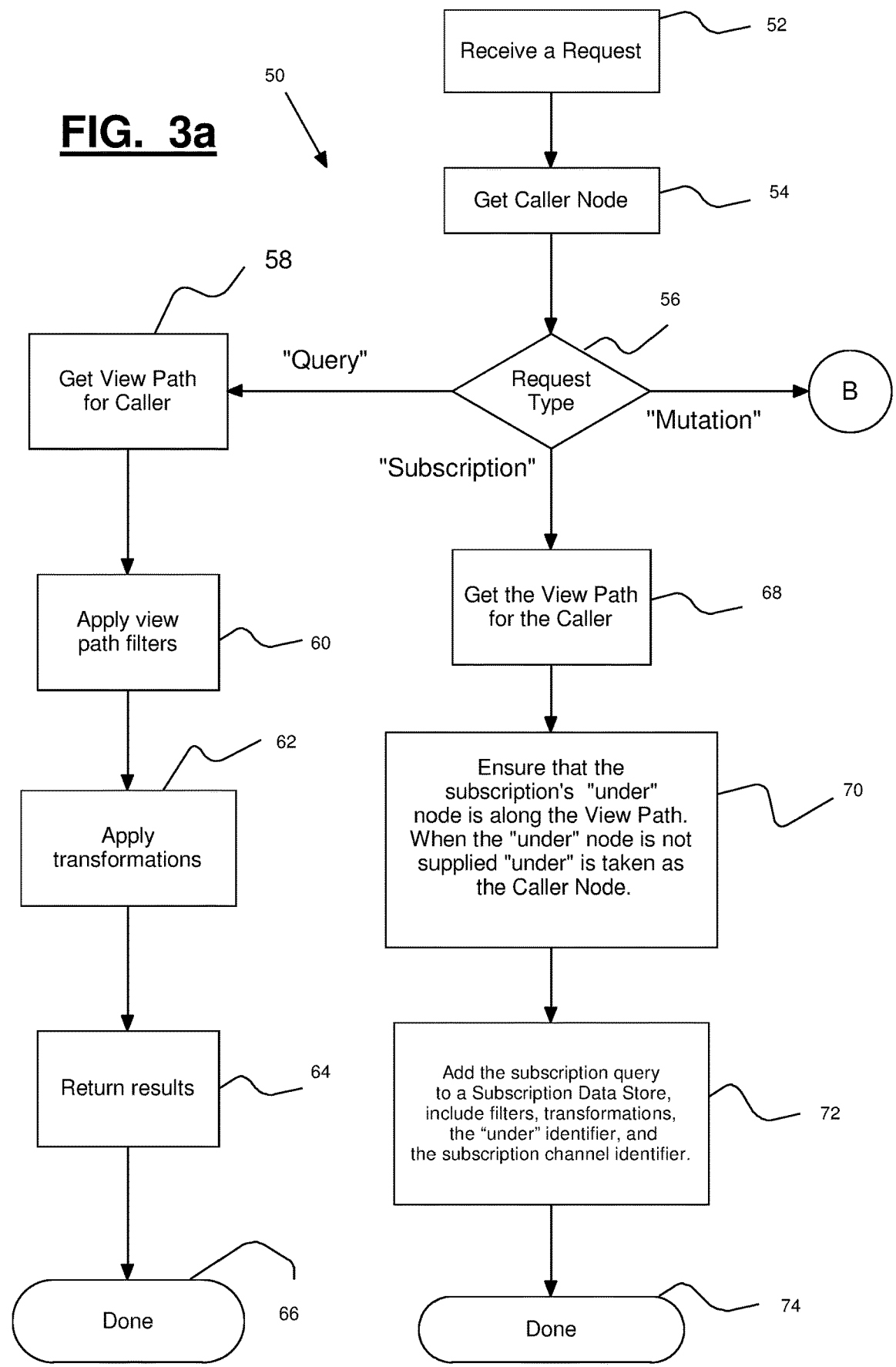

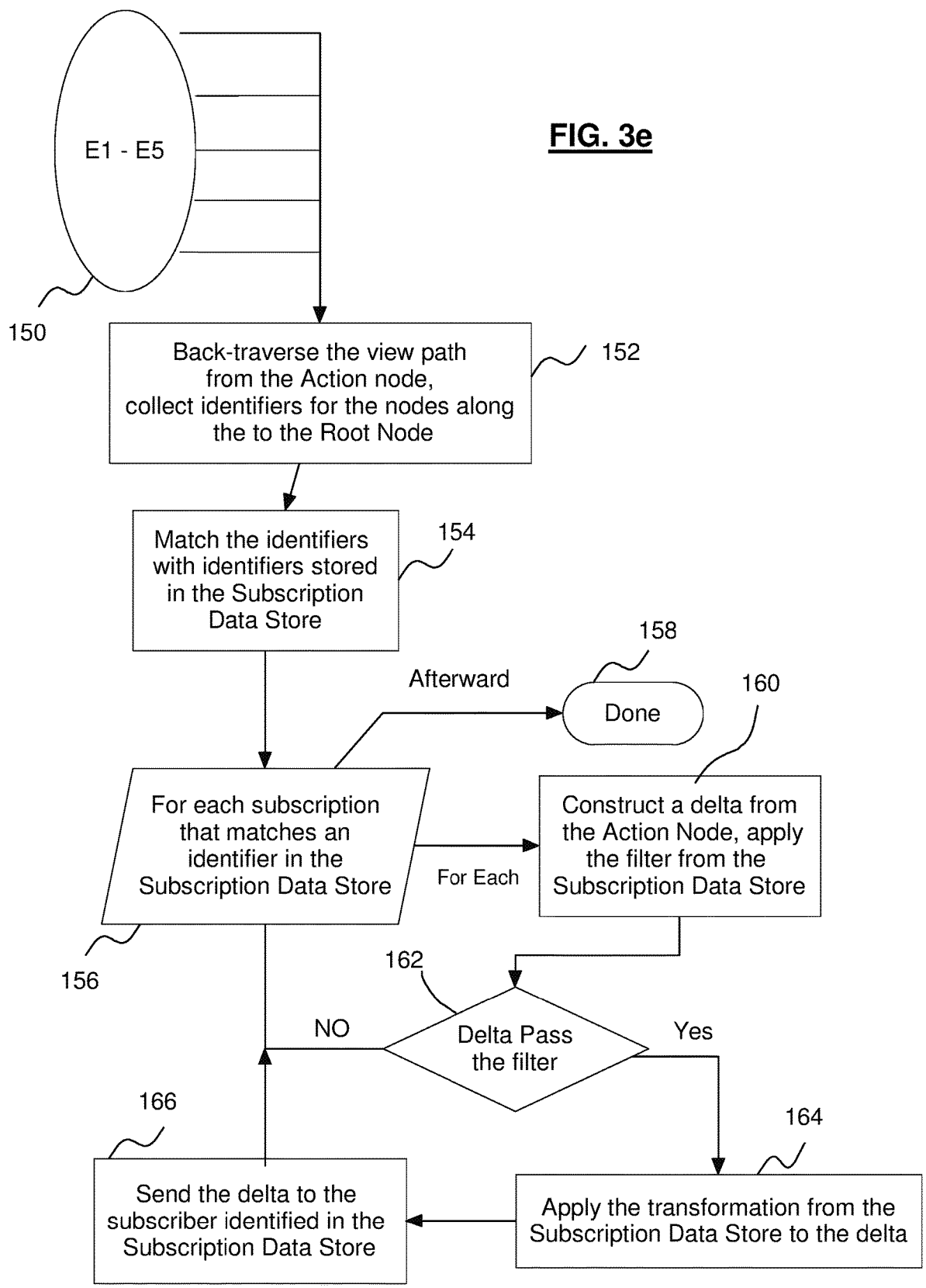

PERMISSIONS—ENFORCED GRAPH DATABASE

BACKGROUND OF THE INVENTION

Field of the Invention

The present invention relates generally to graph databases, and more particularly, to accessing, managing, and editing authorizations and permissions within a graph database.

Description of Related Art

A database is an organized collection of data that can be stored, accessed, searched, manipulated, and edited. One example of a database is a table database listing a large volume of individual addresses, wherein a separate column is provided for name, street number, street name, city, state, county, and country. This data can be easily searched and edited. However, if additional information is included, such as an individual's education, profession, work address, automobile, vacation home, pets, spouse, children, birthday, hair color, eye color, favorite foods, favorite sports, etc., and you want to do a search to correlate commonalities between individuals, it can become quite complicated. Furthermore, if permission to access certain information is limited to certain individuals, such as age, weight, income, medical history, then limiting search results according to certain authorization or permission levels becomes even more complicated.

A graph database is a more general purpose data structure than a table, and more easily translatable from human visualization to computer coding. A graph database is composed of nodes and edges, and properties to represent and store data. A graph structure relates the data items as a collection of nodes and edges, wherein the edges represent the relationships between the nodes. Theses relationships allow stored data to be linked together directly and retrieved with one operation. Graph databases store relationships between data as a priority. Querying relationships is fast because they are perpetually stored in the database. Relationships can be intuitively visualized using graph databases, making them useful for complicated inter-connected data.

Graph databases organize data as it is viewed conceptually. This is achieved by storing data in nodes and relationships between the nodes as edges. Nodes represent entities or instances such as people, businesses, accounts, or any other item to be tracked. Nodes are basically the equivalent of a record, relation, or row in a relational database, or a document in a document-stored database. Edges are lines that connect the nodes to other nodes, representing the relationship between the nodes. Patterns can be realized when examining the connections and interconnections of nodes, properties and edges. The edges can either be directed or undirected. In an undirected graph, an edge connecting two nodes has a single meaning. In a directed graph, the edges connecting two different nodes have different meanings, depending on their direction. Edges are the key concept in graph databases, representing an abstraction that is not directly implemented in a relational model or a document-stored model. Properties are information corresponding to the nodes.

Permissions or authorizations can be established within graph databases to limit access to certain nodes to those individuals or entities authorized to access such information. As information and properties are edited within complex graph databases, and people are promoted and entities changed, the need to modify the authorizations or permissions to access certain nodes or information also changes. Such ongoing changes to permissions within a complex graph database can be time consuming, costly, and subject to unintended error.

Accordingly, there is a need for a graph database structure that enables permissions to nodes and edges in a complex graph database to be more easily edited in a timely and cost effective manner that is less prone to unintended error.

ASPECTS AND SUMMARY OF THE PRESENT INVENTION

One aspect of the present invention is to provide a graph database structure that enables permissions in complex graph databases to be edited more efficiently.

Another aspect of the present invention is to provide a graph database structure that enables permissions in a complex graph database to be edited in less time and for lower cost.

A further aspect of the present invention is to provide a graph database structure that enables numerous permissions in a complex graph database to be edited with a lower chance of error.

An additional aspect of the present invention is to enable a user to more easily edit permissions to specific edges and nodes within a complex graph database.

In order to provide these aspects and others, the present invention provides an internally-constructed permissions graph database wherein access to the graph database enables a user to construct and alter the graph database based on permissions described within the graph database. While graph databases have edges that can be directed or undirected, the edges in the present invention are directed, and the nodes and edges have properties associated with them. The present invention also privately stores a back-edge to make back-traversals efficient. This back-edge is inaccessible to any caller. A back-edge exists for each edge, and it connects a source and terminal edge in the reverse order to an existing edge. The back-edge allows the system to traverse backwards for certain queries to operate efficiently, but cannot be traversed by callers.

In accordance with the present invention, each edge is required to have special permission properties. These permission properties describe whether one node can View, Edit, or Manage another node. One node can view another node if there is at least one path of edges connecting the nodes, wherein that edge allows 'View' permission. Similarly, a node can edit another node if there is at least one path of edges connecting the nodes wherein each edge allows "Edit" permissions, and a node can manage another node if there is a least one path of edges connecting the nodes wherein each edge allows "Manage" permission. If a contiguous path of permission edges does not exist from the "caller node" to the "requested node" to be acted upon then permission to perform the desired action or operation on that node is not granted.

Permissions are the edges that enable the implementation of the present invention. For example, Node A may have permissions over Node B, wherein Node A is considered the "Caller Node" and Node B is considered the "Requested Node." The present invention is flexible as how to enable someone or something to become a caller. An embodiment may have an intermediate system in place that authenticates the person or system making the request. The system confirms that the user or system is allowed to control the caller node, and after authentication is confirmed, the system grants the user or system a license to make requests on behalf of the caller node, and this authorized user or system is referred to as a "caller."

A Caller Node having a contiguous "View Path" to a "Requested Node" allows the caller to "view" or see the properties of a Requested Node. A Caller Node having Edit permissions over a Requested Node enables the caller to add, edit, and remove properties on the Requested Node. A caller having Manage permissions over a Requested Node allows the caller to add and remove certain permission Edges to the Requested Node.

Adding an edge requires several permissions. In order to add an edge between a source and terminal node, the caller node must have at least one contiguous View path to the source node. The caller node must also have at least one contiguous Manage path to the terminal node. The caller node may assign a View edge between the source and the terminal nodes only if the caller node has at least one contiguous View path to the terminal node. The same contiguous View path requirement exists for the Edit and Manage permissions. For example, referring to FIG. 2, since the Caller Node 32 has a View Edge, an Edit Edge and a Manage Edge 42 to the Terminal Node 36, and the Caller Node 32 has a View Edge 38 to the Source Node 34, the caller is permitted to create any combination of View edge, an Edit edge, a Manage edge between the Source Node 34 and the Terminal Node 36. If, for example, the Caller Node 32 did not have Edit permissions over the Terminal Node 36, the Caller Node 32 would not be able to assign an Edit permission between the Source Node 32 and the Terminal Node 36. If the Caller Node 32 did not have a View Edge to the Terminal Node 36, the caller would not be permitted to add a View edge between the Source Node 34 and the Terminal Node 36. If the Caller Node 32 did not have Manage permissions over the Terminal Node 36, the Caller Node 32 would not be permitted to add any edges between the Source Node 34 and the Terminal Node 36. Since the Caller Node 32 can view the Source Node 34 and can Manage the Terminal Node 36, the Caller Node 32 is permitted to add an edge 40 between the Source Node 34 and the Terminal Node 36. The allowable permissions are controlled by the edge 42 between the Caller Node 32 and the Terminal Node 36.

Both Source and Terminal nodes are nodes within the graph and represent nodes involved in an edge operation, such as adding or removing an edge. Since the edges are directed in the present invention, a caller node needs to distinguish the start node and end node of the operation. If the operation succeeds, the source node would have the specified permissions over the terminal node.

To illustrate, if an author operating as a caller node, is writing a book which is represented as a terminal node, the author can View, Edit, and Manage that book. Since the author can Mange the book, the author also can decide who can View and Edit the book. If the author wishes to allow their publisher, (represented by a source node) to View and Edit the book, the author must be able to View the publisher. Since the author is permitted to View and Edit the book, the author can delegate that to the publisher. The author can also choose to permit other nodes view the book. If the author wants a neighbor (another possible source node) to read the book (the terminal node), the author can grant the neighbor View permission, but not the edit permission. The author can only do this because the author can Manage and View the book. Under this system, the neighbor would not be allowed to let others read the book since they do not Manage the book. The neighbor cannot edit the book and therefore cannot permit others edit the book either.

In our example, if the publisher wants to delegate the editing to a third party, the author would need to grant the publisher the ability to share the book with the third-party. To do that, the author (caller node) would either need to grant the third-party editor (source node) Edit permissions over the book (terminal node). Alternatively, the author (caller node) could grant the publisher (source node) the ability to Manage the book (terminal node). The publisher would then be able to grant the third-party the View and Edit rights.

The author (caller node) need not Manage the publisher (a source), neighbors (a source), or the third-party (a source), to grant them rights to View the book. The author only needs to Manage the book and to View the source node.

The graph database of the present invention must be populated with a node designated as the "root node." The root node must have at least one contiguous View, Edit, and Manage path to all other nodes. In this way, the root node has all permissions over every other node. This criteria must be preserved under all operations and prevents orphans, which are nodes that are not controlled by any nodes in the graph. The root node is the only node which is permitted to not be a terminal node.

Unless prohibited by an embodiment, a caller, at any time, can create a node. When this happens, an edge between the caller and the created node is automatically created having View, Edit and Manage permissions.

A caller node can modify the permissions between a source node and a terminal node as long as certain criteria are met. As discussed earlier, to do this, the caller node must have a contiguous View path to the source node, and the caller node must have a contiguous Manage path to the terminal node. The type of edges that can be added between a source node and a terminal node are controlled by the edge between the caller node and the terminal node. The caller node is permitted to add Edit permissions between the source node and terminal node, so long as the caller node has both a contiguous Edit path from the caller node to the terminal node, and a contiguous Manage path from the caller node to the terminal node. Likewise, for the View and Manage permissions, the caller node is permitted to remove Edit permissions between the source node and terminal node so long as three criteria are met: (i) there exists a contiguous Edit path between the caller node and the terminal node; (ii) there exists at least one other Edit edge terminating at the terminal node; and (iii) the caller node has a contiguous Manage path to the terminal node. A caller node can delete a node as long as two criteria are met: (i) the caller node has a contiguous Manage path to the node; and (ii) the side-effect of deleting the node does not create orphans, in other words, deleting a node preserves the requirement that the root node has a contiguous View, Edit, and Manage path to all nodes in the graph. The second criteria may be implemented in multiple ways, depending on the needs of the system. In the most conservative case, the system can require that there are no outbound edges leaving the node that is to be deleted. Alternatively, the system can repeat through all nodes whose source node is the node to be deleted. The system then permits a node to be deleted if the root node has at least one contiguous view, edit, and manage path to all these nodes that does not pass through the node to be deleted, thus avoiding the creation of any orphan nodes.

A caller node can request the value of properties on a Requested Node. The system is permitted to return this information to the caller node as long as there is a contiguous View path between the caller node and the Requested Node. A caller node can request to add, edit, or remove a property from a Requested Node as long as there exists at least one contiguous edge path between the caller node and the requested node wherein all edges have Edit permissions. The system is permitted to make the update as long as there exists a contiguous Edit path between the caller node and the Requested Node.

Querying the properties of nodes is done through a series of filters. A caller node can request all the nodes that the caller node is permitted to view, or a caller node can query for all nodes under a parent node specified by an identifier. The system will only return node properties that can be viewed as described above. The system allows for filtering as well, but is flexible regarding how filtering is implemented. The system can filter based on whether a property exists, or whether a property matches a value, or if a property satisfies some condition, or whether the path satisfies some condition.

As information within the system is added, removed or changed, queries can become stale. A caller node can request up to date information on changes to the results of queries. As such, a caller node can become a subscriber by subscribing to Deltas on queries. A subscription can be created on any query which designated as query subscriptions. A subscription is equivalent to a Query that receives updates in near real-time. When a change happens in the database, the system automatically checks to see if there are any subscribers that would see the actions performed. If there exists such a subscriber, instead of resending all the data to the subscriber, the system just sends the update. The update is called a "Delta," which is a small packet of information that only encapsulates the change. The information required determines subscription changes that are stored in a subscription store. This information includes the caller, the filter, the 'under' node, as well as any information required by the embodiment to communicate with the subscriber.

When a node is added, removed, changed, or when permissions between nodes are added, removed, or changed, the system shall identify all subscriptions which are impacted by the change. A Delta is constructed for each impacted subscription and sent to that subscriber.

A Delta minimally describes the changes that have taken place with respect to a query subscription. The Delta contains enough detail to apply the change to an existing query. A Delta can be applied forward or backward in time. Therefore a Delta must contain enough information to describe the event both forwards and backwards. For a Delta applied backwards in time, the subscriber must invert the delta's instruction. For a node that is created, the inverse instruction is to "remove" the node. For a node that is edited, the inverse is to apply an edit containing the previous state. For a node that is removed, its inverse instruction is to "create" the node with its previous properties.

A Create Delta is constructed when a node is created and there exists a query subscription that, if the corresponding query were executed, the created node would be contained in the result. The Create Delta contains the "create" instruction as well as the properties of the newly created node. The Create Delta is then sent to each such query subscription.

A Remove Delta is constructed when a node is removed and there exists a query subscription that exists prior to removing the node, and the subscription's corresponding query, after executing, would have been contained in the result. The Remove Delta contains the "remove" instruction as well as an identifier and the properties of the removed node.

A subscription listens to a query. If the results in the query were to change, the subscriber is notified of the change. A Remove Delta is sent any time a node stops being the result of a subscription query.

An Edit Delta is constructed automatically by the system when a node's properties are edited and there exists a query subscription whose corresponding query returns the node. The Edit Delta contains the "edit" instruction, as well as the name of the properties that are edited and their corresponding old and current values.

If a permission edge is added to a node, referred to as an Action node, the system must traverse backward along all view paths until each path hits the root node and determines if any there are subscriptions to nodes that are passed through. For each such subscription, the system checks two criteria: (i) the corresponding query as seen by the caller node prior to the change, would not return the Action node; and (ii) after the permission change, the query as seen by the caller will, in fact, return the Action node. If both are satisfied, the system constructs a Create Delta, specifying the "create" instruction and the properties of the Action node.

If a permission edge is removed from a node, referred to as an Action node, the system must traverse backward along all view paths until each path hits the root node and determines if any there are subscriptions to nodes that are passed through. For each such subscription, the system checks two criteria: (i) that the corresponding query as seen by the caller, prior to the change, would return the Action node; and (ii) that after the permission change, that the query as seen by the caller will not return the Action node. If both are satisfied, the system constructs a Remove Delta, specifying the "remove" instruction as well as the Action node's identifier and the properties of the Action node.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIGS. 3a-3e are a flowchart illustrating the preferred process of the present invention.

DETAILED DESCRIPTION OF THE PREFERRED EMBODIMENT

Figure 1:
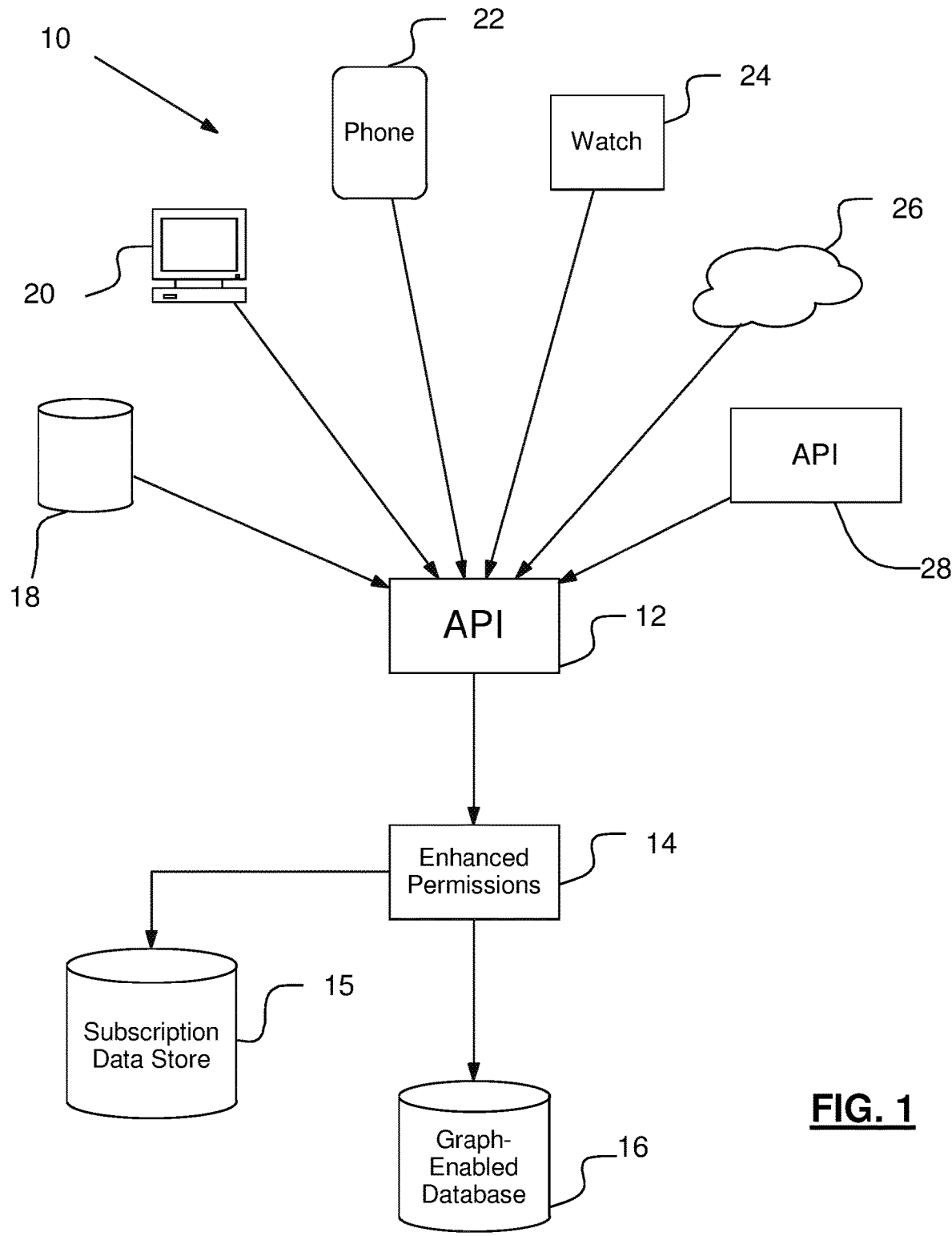
FIG. 1 is a diagram of potential components that may utilize the system and process of the present invention.

Referring now to the drawings, FIG. 1 illustrates a system 10 incorporating potential components or elements utilizing the process of the present invention. Included within the system 10 is a connection or interface with the internet 18, a desktop or laptop computer 20, a smartphone 22, a smartwatch 24, the cloud 26, and an external application programming interface (API) 28. All of these external components feed into the Applicant Programming Interface (API) 12 that is connected to the enhanced permissions process system 14 of the present invention that interface with a graph enabled database 16. The enhanced permissions can also be stored within a subscription data store 15.

Figure 2A:
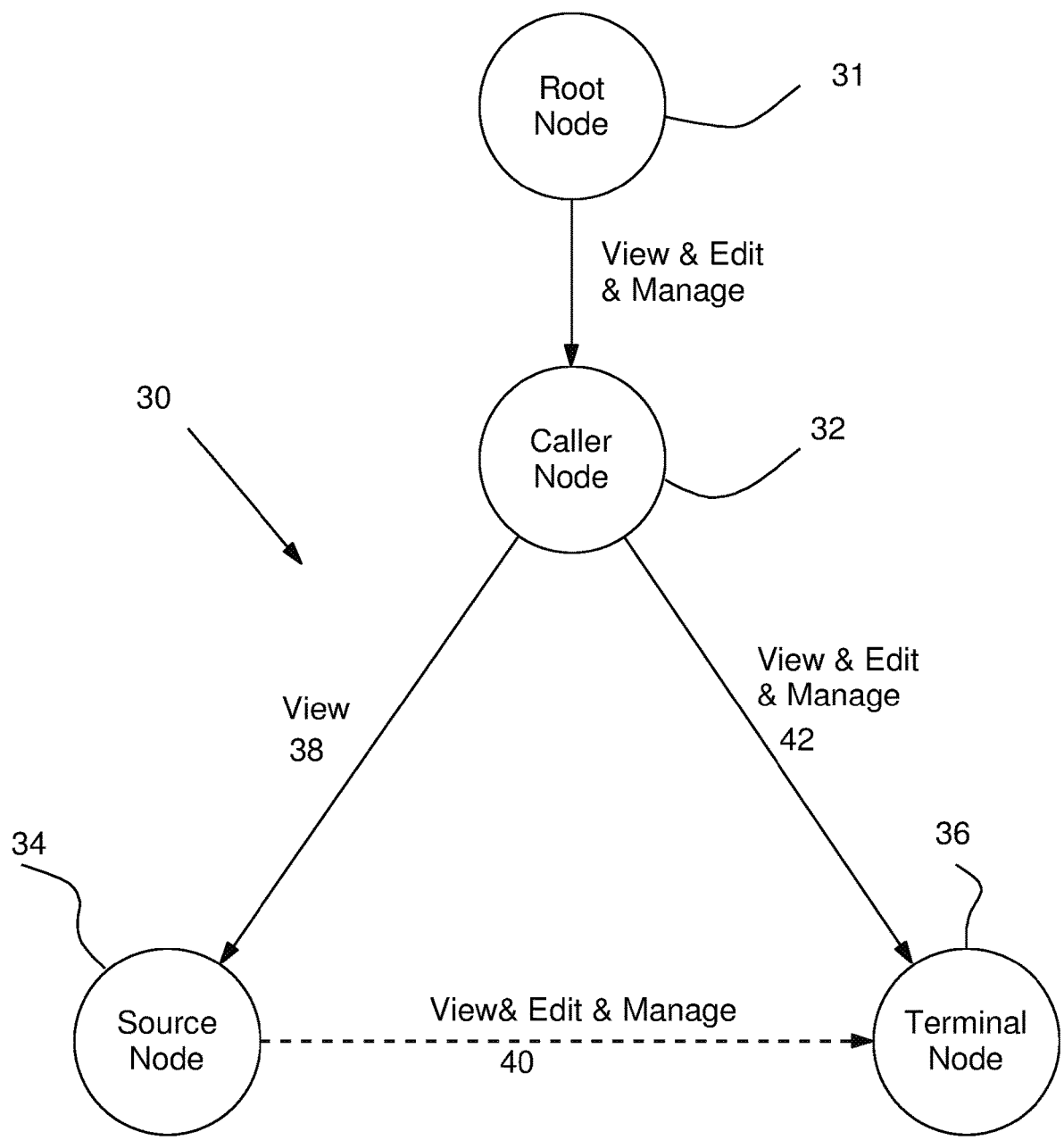
FIG. 2a is a diagram of a graph database utilizing edges and nodes in accordance with the present invention.

FIG. 2a illustrates a basic graph database 30 configured in accordance with the present invention. FIG. 2a illustrates adding an edge between nodes within the graph database in accordance with the present invention. A Root Node 31 having a View, Edit & Mange Edge connected to the Called Node also is illustrated. As discussed in the Background of the Invention, adding an edge requires several permissions. In order to add an edge 40 between a source node 34 and terminal node 36, the caller node 32 must have at least have one contiguous View path 38 to the source node 34. The caller node 32 also must also have at least one contiguous Manage path to the terminal node 36. The caller node 32 may assign a View edge 40 between the source node 34 and the terminal node 36 only if the caller node 32 has at least one contiguous View path 42 to the terminal node 36. The same contiguous View path requirement exists to add Edit and Manage permissions to an edge between the source node and the terminal node. The Manage permission enables a caller to modify inbound edges to a node. The Edit permission enables a caller to modify the properties of a node.

For example, referring to FIG. 2a, the caller node 32 can create a View edge, an Edit edge, and a Manage edge between the source node 34 and the terminal node 36. If, for example, the caller node 32 did not have Edit permissions via edge 42 over the terminal node 36, the caller node 32 would not be able to assign the Edit permission between the source node 34 and the terminal node 36. Since the caller node 32 can view the source node 34 via edge 38 and can Manage the terminal node 36 via edge 42, the caller node 32 is permitted to add an edge 40 between the Source node 34 and the Terminal node 36. The allowable permissions are dictated by the edge 42 between the caller node 32 and the terminal node 36.

Figure 2B:
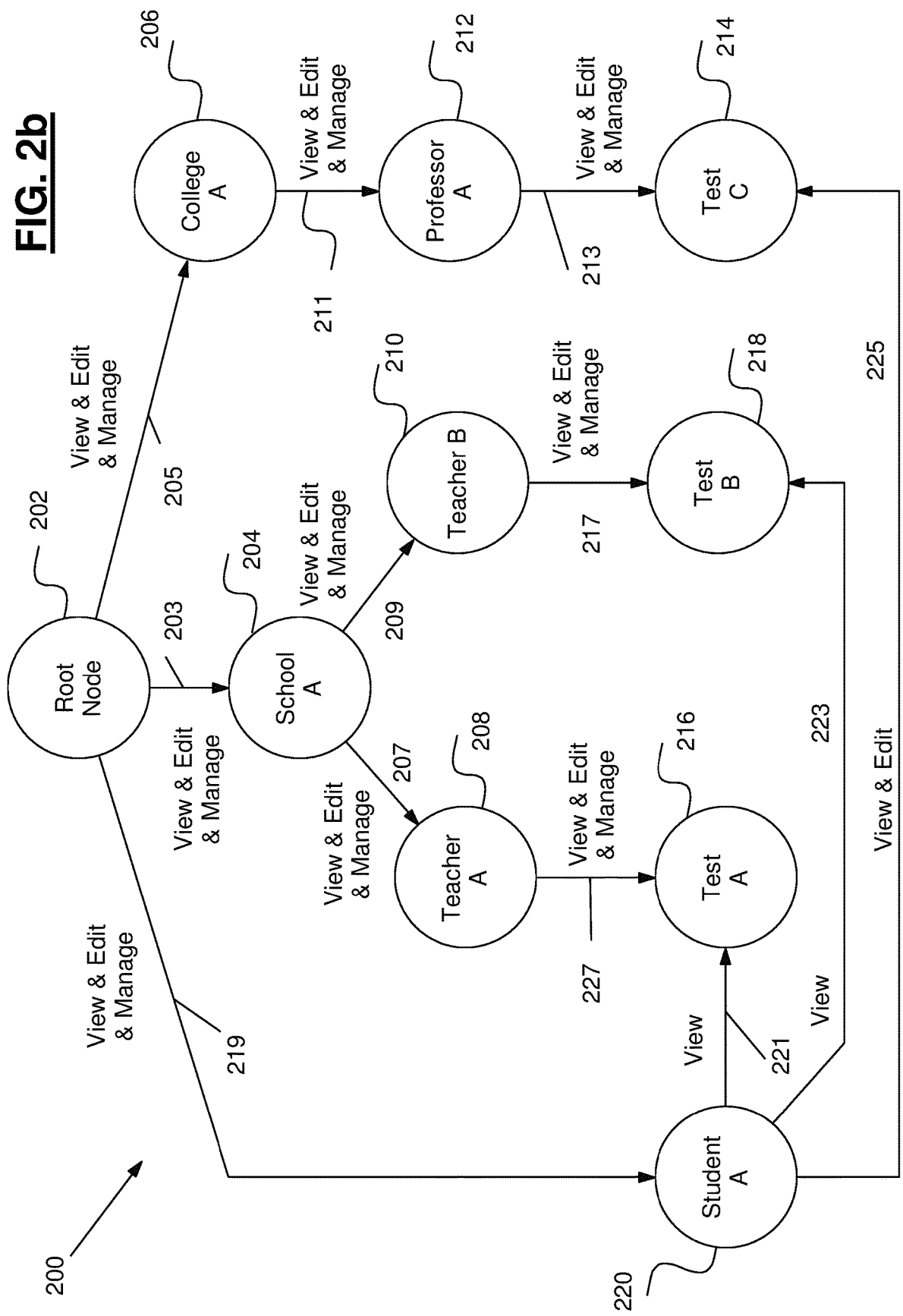
FIG. 2b is a diagram of graph database configured in accordance with the present invention for a test taking and grading platform.

FIG. 2b illustrates a graph database 200 configured in accordance with the present invention for storing test results and grades on a platform. This graph database 200 enables students to take tests on the platform, and view grades from previous tests. Teachers view, edit and manage the tests. Teachers can control the inbound edge for tests they create, so while taking the test, a student may edit the node. Once the test is over, the teacher removes the edit edge from the student user to the node. The teacher may then edit the grade on the test. The student does not need a separate login for each teacher, nor each school, nor even once they attend college. In this embodiment, school teachers can modify grades on tests, and modify edges. If a child's parents had a node in the system, the teacher could allow parents to see grades for their own children's tests that the teacher manages. This embodiment can be configured to enable parents have a login and view their children's grades. In the illustrated embodiments of FIG. 2b, the root node, pursuant to a request from a teacher or a professor, can add an edge from a student node to view and edit (ie, take) a test node.

It should be noted that there is a continuous path of edge permissions between the Root Node 202 and all of the illustrated nodes 204, 206, 208, 210, 212, 214, 216, and 218 in sample graph database FIG. 2b configured in accordance with the present invention. For example, The Root Node 202 can view and edit the properties of the Test Node C 214 via the view and edit edge permissions on edges 205, 211, and 213 providing a continuous view and edit edge permissions path between Root Node 202 and Test C Node 214. Similarly, School A Node 204 can view and edit the properties of Test B Node 218 via the view and edit edge permission on edges 209 and 217 providing a continuous view and edit edge permissions path between School A Node 204 and Test B Node 218. Additionally, Root Node 202 can add an edit edge permission on edge 223 between Student A Node 220 and Test B Node 218 because Root Node 202 has a continuous view edge permission path to Student A Node 220 (source node for creating an edge permission) via edge 219 and Test B Node 218 (terminal node for creating an edge permission) via a continuous manage edge permission path along edges 203, 209, and 217. Student A can view and edit Test C via node 225, and Student A can view Test A via node 221. Root Node 202 can view, edit, and manage Test A via node 203, 207, and 227.

FIGS. 3a-3e illustrate a flowchart 50 illustrating the steps of a preferred embodiment of the present invention. Beginning with step 52 Receiving a Request, a listening interface receives information, either from the API 12 (FIG. 1) or another system. The request contains all information necessary to apply the request to the system. Request Types will either be a Query to attempt to view information, or a Subscription to attempt to listen for changes to nodes, or a Mutation to attempt to update the graph. Requests can contain information about how to transform the results or about filtering results. The system enables results to be filtered based on properties of the nodes or characteristics of the edge path (like how many edges are in the path). The present invention enables filtering requests 'under' another node. For Node A to be considered 'under' Node B, there must be a contiguous path starting from Node B to Node A. Mutations include information about changing the graph, such as adding/removing an edge, adding/removing a node, or updating properties attached to the node.

Next at step 54 the system obtains the node that represents the caller node. Next at step 56 the system determines the request type. If the request is for viewing information, the request type is query. If request is a listing for changes, the request type is a subscription. If request is for changing information on the graph (such as adding/removing a node, adding/removing an edge, or editing properties), the request type is a mutation.

If a Query, the system moves to step 58 to obtain the View path of the caller node. The system recursively gets a list of nodes that are connected to the caller node with a chain of View edges. Depending on the graph database, this step 58 could be a depth-first search or breadth-first search.

There are many implementations of a depth-first search. Generally, a depth-first search is a procedure that starts at some node and follows the path downward visiting each node until it reaches a node which has no paths to any other nodes that have not already been visited. The procedure backtracks, until it finds another node that has paths to unvisited nodes. The procedure traces that path downward and repeats. The search stops when the search criteria is met. Depth-first searches are most useful in finding nodes that are furthest from the starting point.

A breadth-first search also has many implementations. Generally, a breadth-first search is a procedure that starts at some specified node and follows a path downward one node, then backtracks and moves downward to the next unvisited node. The procedure is continued until all nodes directly underneath are visited. The procedure then continues with the first visited node that still has unvisited decedents. The process stops when the search criteria is met. Breadth-first searches are most useful in finding nodes that are closest to the starting point. Any searching method will work so long as all nodes are able to be visited.

For a depth-first search, the system will construct a list. For each node added to the list, the system will find all outbound View edges from such node, and if the node is not already present in the list, add such node to the list. The system begins by adding the caller node.

Next at step 60 the system applies view path filters, wherein it filters out nodes, edges, or paths based on the supplied filters. The filtration methods are implementation dependent. This step receives the View Path and systematically removes nodes from the result.

At step 62, Apply transformations, if the properties are to be altered before presenting the results, this stage applies those alterations. If no alterations are to be performed, depending on the embodiment, this stage is skipped, or a copy of the result with no modifications are sent to the next step.

At step 64, Return results, results are sent back to the request origin, usually over a network. The resulting list of nodes is returned to the caller.

At step 66, the system terminates after a Query request from step 56.

Referring back to step 56, Request Type, if a Subscription Request, the system moves to step 68, Get the View Path for the Caller. The system recursively gets a list of nodes that are connected to the caller with a chain of View edges. Depending on the embodiment, this could be a depth-first search or breadth-first search. For a depth-first search, the system will construct a list. For each node added to the list, the system will find all outbound View edges from such node, and if the node is not already present in the list, add such node to the list. The system begins by adding the caller node.

Next at step 70, the system determines if the changes the caller node is subscribing to would be visible to the caller node. A subscription informs the caller of the changes the caller would see in results, should they make a query before and after the change. A subscription may be over all the nodes visible to a user, or it may be over a subset of visible nodes, under a named node. We call this the 'under' node. To subscribe to a change, the system checks that the caller can view the 'under' node. To subscribe to a change the system checks to see that the caller can view all nodes along the query path. The 'under' parameter is a filter that the caller uses to chooses a subset of the caller's view graph upon which to operate.

At step 72, the system stores information about the caller's subscription. This information is used to inform the caller when a modification is performed. This information is cross-referenced under any modification. Information includes the identification of the caller, the subscription filters and transformations, and the 'under' node identifier for the subset of the graph the caller has requested. Any information that is required to notify the subscriber must be stored as well.

Finally, at step 74, the system terminates after a Subscription request from step 56.

Figure 3B:
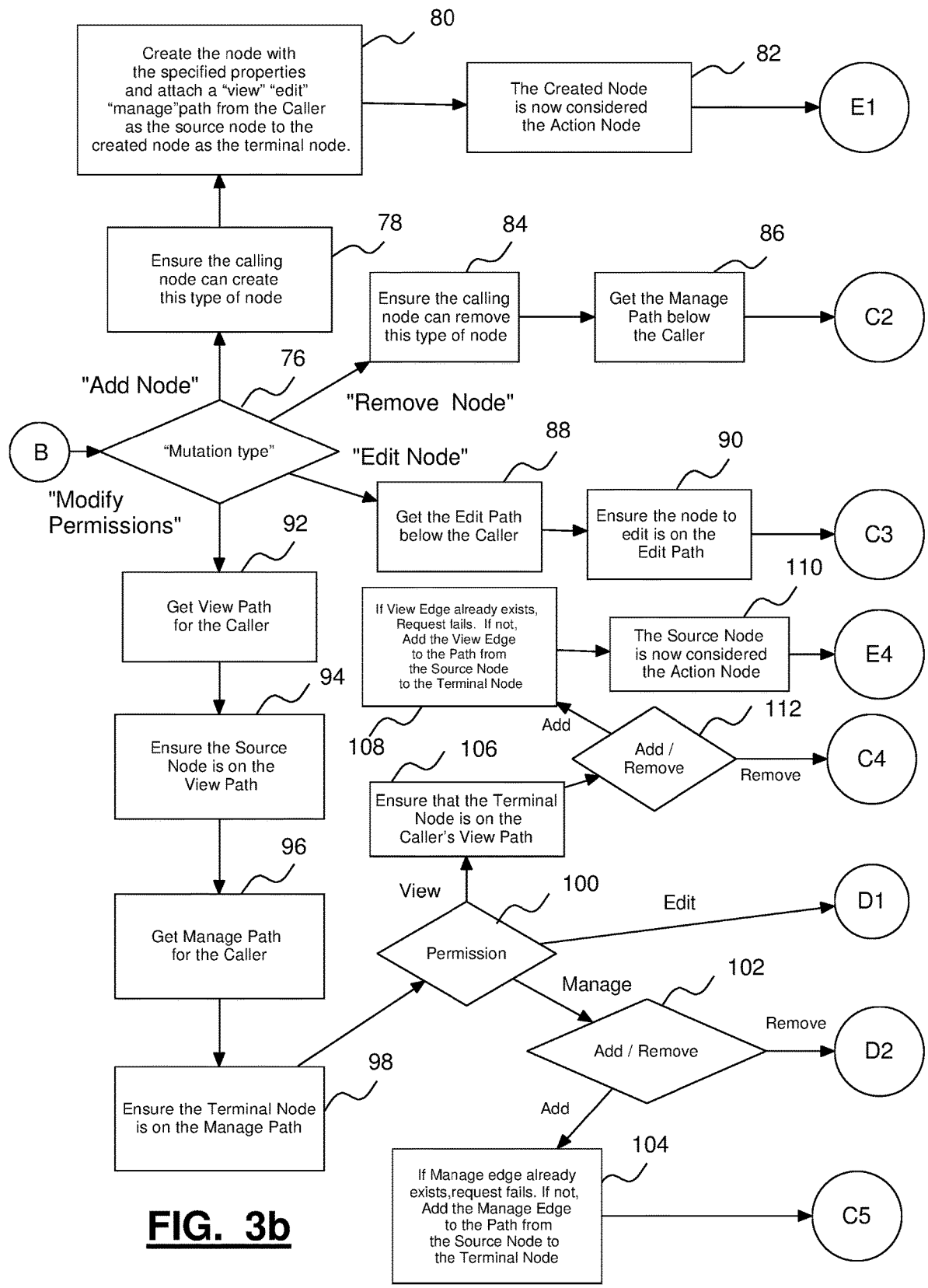

Returning back to step 56, if the Request type is a Mutation, the system moves to step 76 in FIG. 3b, wherein the caller requests Adding a node, Removing a node, Editing the properties of a node, or Modifying permissions on a node. If the Mutation type is an Add Node, the system moves to step 78, wherein the system white-list or black-list the types of nodes that a caller can generate. In such an embodiment the system will allow or disallow progress through the workflow. A black-list consists of a list of node types that a caller is not allowed to create. A white-list is a list of node types that the caller is allowed to create. For embodiments that do not white-list or black-list, it is equivalent to a blacklist with no disallowances.

Next at step 80 the systems constructs the Requested Node, with the requested properties, and automatically adds a View, Edit, and Manage edge permissions from the caller's node to the newly created node. Then at step 82 the created node is referred to an Action Node.

Remaining on FIG. 3b and referring back to step 76, if the Mutation type is a Modify Permissions, the system moves to step 92, Get View Path from Caller, wherein the system recursively gets a list of nodes that are connected to the caller with a chain of View edges. Depending on the embodiment this could be a depth-first search or breadth-first search. For a depth-first search, the system will construct a list. For each node added to the list, the system will find all outbound View edges from such node and if the node is not already present in the list, add such node to the list. The system begins by adding the caller.

Next at step 94, the system confirms that the source node is in the View path list. Then at step 96 the system recursively gets the path of nodes that have a Manage path originating from the caller. Depending on the embodiment this could be a depth-first search or breadth-first search. For a depth-first search, the system will construct a list. For each node added to the list, the system will find all outbound Manage edges from such node, and if the node is not already present in the list, add such node to the list. The system begins by adding the caller. At step 98, the system confirms that the terminal node exists in the Manage list.

From step 98 the system moves to step 100, wherein, depending upon the request, a caller can alter the View or Edit or Manage edges. Different embodiments may also enable editing (i) View & Edit, (ii) Edit & Manage, (iii) View & Manage, or (iv) View & Edit & Manage edges within a single request. In the illustrated embodiment, the system repeats step 100 for each type of permission. Depending on the embodiment, should any check fail, all edge changes will fail. Other implementations allow some to fail while others succeed. Should the embodiment require all checks to pass, the embodiment must wait until all edges pass all checks before writing any changes to the graph.

If a View request, the system proceeds from step 100 to step 106 to confirm that the Terminal Node is on the View list generated previously. From step 106 to step 112 to determine whether to add or remove, and the request must contain an instruction to add or remove the edge. At step 108 the system checks if a View edge already exists, and is so, the request fails. After confirming that a View edge does not already exist between the Source and the Terminal node, the system writes a View edge to the graph from the Source to the Terminal at step 108. Next at step 110 the Source node is now called the Action Node within the workflow.

Looking back at step 100, if the request is to Manage, the system moves to step 102 to Add or Remove a Manage Permission, and if Add is selected, the system moves to step 104, wherein the system checks if a Manage Edge already exist, and if so, the request fails. If no Manage edge, a Manage edge is added to the path from the Source Node to the Terminal Node. From step 104 the system moves to step 130 in FIG. 3c.

Referring back to Mutation type at step 76, if Remove Node is requested, the system moves to step 84, wherein embodiments that white-list or blacklist the types of nodes that can be removed, a check is performed here to validate that the node the caller is requesting removal for is permitted. In embodiments that do not have a white-list or black-list, it is equivalent to a black-list with no disallowances. Next at step 86 the system gets the Manage Path below the Caller. The system recursively gets the path of nodes that have a Manage path originating from the caller. Depending on the embodiment this could be a depth-first search or breadth-first search. For a depth-first search, the system will construct a list. For each node added to the list, the system will find all outbound Manage edges from such node, and if the node is not already present in the list, add such node to the list. The system begins by adding the caller.

Referring back to Mutation type at step 76, if Edit Node is selected, the system gets the Edit Path below the caller at step 88. The system recursively gets the path of nodes that have a Edit path originating from the caller. Depending on the embodiment this could be a depth-first search or breadth-first search. For a depth-first search, the system will construct a list. For each node added to the list, the system will find all outbound Edit edges from such node, and if the node is not already present in the list, add such node to the list. The system begins by adding the caller. Next at step 90 the system confirms that the node being edited appears in the list.

Figure 3C:
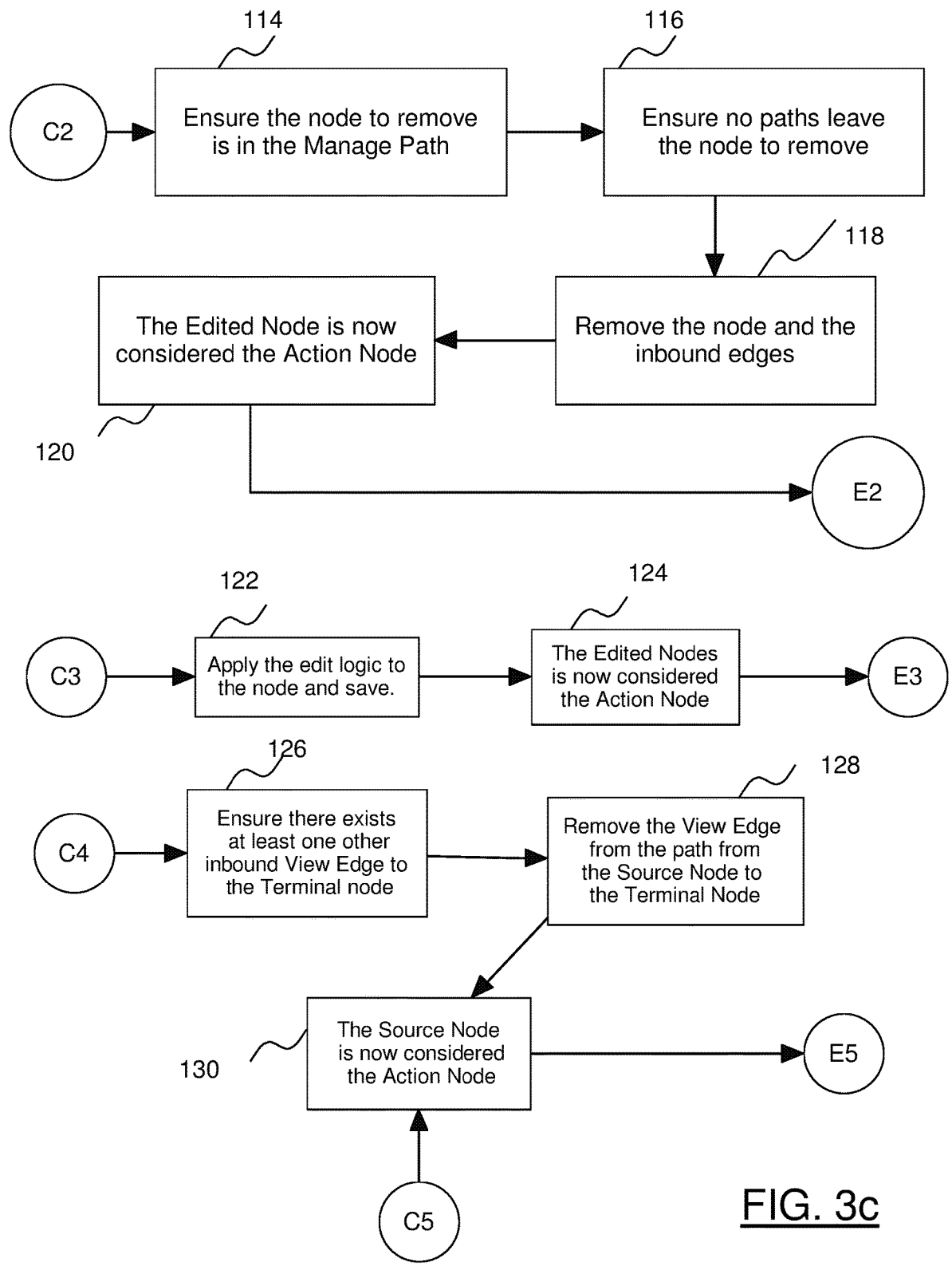

Referring now to step 114 in FIG. 3c, which follows step 86 from FIG. 3b, the system confirms that the requested node appears in the list, and if not, the request fails. Next in step 116 the system confirms that no edges of any kind leave the node to be removed. If any such edges exist, the request fails. Next in step 118, after confirming the removal is allowed, the system applies the update to the graph. Further in step 120 the system now refers to the removed node as the Action Node.

Step 122 in FIG. 3c, which follows step 90 in FIG. 3b, the system modifies a property on the node as specified in the request. Then at step 124 the newly edited node is now considered an Action Node.

Step 126 in FIG. 3c, which follows step 112 in FIG. 3b, in order to satisfy the requirement that a contiguous View path from the root node exists to all other nodes, the system must confirm that at least one other View Edge terminates (it is an inbound edge) at the Terminal node. Next at step 128 the system writes the change to the graph. At step 130 the system calls the Source node the Action Node in the rest of the workflow.

Figure 3D:
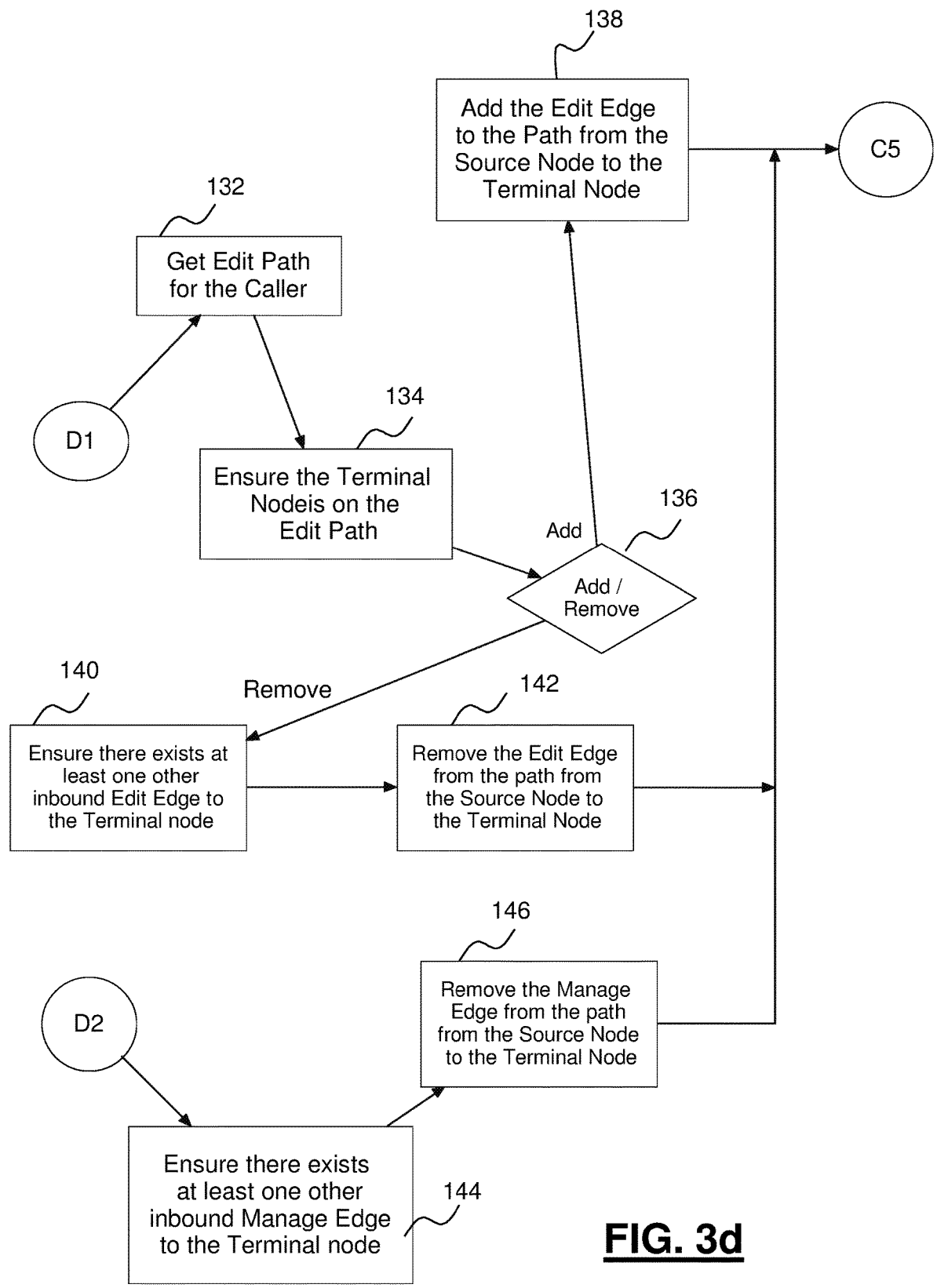

Referring to FIG. 3d, Step 132, which follows from an Edit request at step 100 in FIG. 3b, the system recursively gets the path of nodes that have an Edit path originating from the caller node. Depending on the embodiment this could be a depth-first search or breadth-first search. For a depth-first search, the system will construct a list. For each node added to the list, the system will find all outbound Edit edges from such node, and if the node is not already present in the list, add such node to the list. The system begins by adding the caller node. Next at step 134 the system confirms that the Terminal node exists within the Edit node list. Then at step 136 the request must contain a request Adding or Removing an edge. If the request is to Add an edge, the system moves to step 138, wherein the system writes the Edit edge to the graph. If the request is to Remove at step 136, the system moves to step 140 wherein the system checks to confirm a step in the workflow to ensure that an Edit Edge from the source to the terminal node does exist. If it does not, the request fails. At step 142 the system writes the changes to the graph.

Referring to step 144 in FIG. 3d, which follows from the Remove request of step 102 in FIG. 3b, in order to satisfy the requirement that a contiguous Manage path from the root node exists to all other nodes, the system must confirm that at least one other Manage Edge terminates (it is an inbound edge) at the Terminal node. Then next at step 146 the system writes the changes to the graph.

Referring to FIG. 3e, step 150 follows from multiple steps from other figures, such as steps 82 and 110 from FIG. 3b, and steps 120, 124 and 130 from FIG. 3c. From step 150 the system moves to step 152 to traverse against the view edges until the process reaches the root node while collecting the unique nodes. Next at step 154 the system takes the identifiers from this list of nodes, scans the subscription store list to see if there are any subscriptions with 'under' node identification and matches these identifications. At step 156 the system writes each matching subscription. The system moves to Done at step 158 after iterating though all the possible subscriptions that are a match from a subscription store.

From step 156 the system proceeds to step 160 to take the status before the update and compare it with the status after the update. Then the system constructs a delta which encapsulates all the information to adjust the pre-update state into the post-update state. Next at steps 160-166 the system applies the filter from the subscription wherein the following could happen: (1) if the pre-update state with the filter applied contains the node and the post-update state with the filter applied contains the node, and the update contains alteration to the properties, the system sends a delta with the alterations; (2) if the pre-update state with the filter applied contains the node, and the post-update state with the filter applied does not contain the node, the system sends a delta that indicates the node was removed; and (3) if the pre-update state with the filter applied does not contain the node, and the post-update state with the filter applied contains the node, the systems sends a delta indicating the node was added, along with the properties. If none of these scenarios apply, send no update.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. A method for facilitating permissions within a graph database so as to enable a user of the graph database to construct and alter the graph database based upon edge permissions within the graph database, the method comprising the steps of:

providing a graph database utilizing nodes and edges connecting the nodes, wherein the nodes have properties and the edges have permissions;

providing a root node that has view, edit, manage edge permissions to all the nodes in the graph database;

storing data within the nodes;

defining a caller node, a source node, and a terminal node;

defining edge permissions to include view, edit, and manage, wherein the view edge permission enables a first node to view the properties of a second node, the edit edge permission enables the first node to edit the properties of the second node, the manage edge permission enables a caller node to create an edge between a source node and a terminal node provided the caller node has the view edge permission to the source node and the manage edge permission to the terminal node; and changing the edges between the nodes is limited to control of the caller node having at least the view edge permission to the source node and the manage edge permission to the terminal node.

2. The method of claim 1, further comprising the step of: creating a new edge between the source node and the terminal node pursuant to a request of the caller node wherein an edge having a view edge permission exists between the caller node and the source node, and an edge having a manage edge permission exists between the caller node and the terminal node.

3. The method of claim 2, further comprising the step of: adding an edit edge permission to the edge created between the source node and the terminal node pursuant to the request of the caller node, wherein the edge between the caller node and the terminal node includes an edit edge permission.

4. The method of claim 2, further comprising the step of: adding an edit edge permission to the edge created between the source node and the terminal node pursuant to the request of the caller node, wherein the edges between the caller node and the terminal node provide a continuous edit edge permission path.

5. The method of claim 2, further comprising the step of: adding an view edge permission to the edge created between the source node and the terminal node pursuant to the request of the caller node, wherein the edge between the caller node and the terminal node includes a view edge permission.

6. The method of claim 2, further comprising the step of: adding a view edge permission to the edge created between the source node and the terminal node pursuant to the request of the caller node, wherein a continuous view edge permission path is provided by the edges between the caller node and the terminal node.

7. The method of claim 2, adding a manage edge permission to the edge created between the source node and the terminal node pursuant to the request of the caller node.

8. The method of claim 2, adding an edge permission to the edge created between the source node and the terminal node pursuant to the request of the caller node.

9. The method of claim 8, further comprising the step of: removing the edge permission from the edge between the terminal node at the request of the caller node.

10. The method of claim 1, wherein the caller node and source node are connected by at least one additional node and one additional edge located between the caller node and the source node, and all the edges connecting the caller node to the source node include a view edge permission, thus providing a continuous view edge permission path between the caller node and the source node.

11. The method of claim 1, wherein the caller node and terminal node are connected by at least one additional node and one additional edge located between the caller node and the terminal node, and all the edges connecting the caller node to the terminal node include a manage edge permission, thus providing a continuous manage edge permission path between the caller node and the terminal node.

12. The method of claim 1, wherein the caller node is a node making a request, the source node is a node originating the new edge, and the terminal node is a node terminating the new edge.

13. The method of claim 1, further comprising the step of: storing a back-edge to enable back-traversals, wherein the back-edge is inaccessible to the caller node, and the back-edge exists for each edge in the graph database in order to connect the source edge and the terminal edge in the reverse order of the caller node, and the back-edge enables the system to traverse backwards for queries.

14. The method of claim 1, further comprising the steps of:
sending a first query with first search terms to the nodes within the graph database;
generating first search results based upon the first query;
entering a change in data stored within at least one of the nodes;
sending a second query with the first search terms to the nodes within the graph database;
generating second search results based upon the second query; and
calculating difference between the first search results and the second search results.

15. The method of claim 14, further comprising the steps of:
providing a subscriber to the graph database; and
notifying the subscriber when there is a change in contents of the second search results from the first search results.

16. The method of claim 1, further comprising the step of:
creating a new node connected by a new edge to an existing node at request of the caller, wherein the new edge connecting the new node to the existing node automatically includes view, edit and manage edge permissions.

17. The method of claim 1, further comprising the step of:
removing a node by the caller node wherein the caller node has a continuous manage edge permission path to the node to be removed, and removing the node maintains continuous view, edit, and manage edge permission paths to all remaining nodes from the root node in the graph database.

18. A method for facilitating permissions within a graph database so as to enable a user of the graph database to construct and alter the graph database based upon edge permissions within the graph database, the method comprising the steps of:
providing a graph database utilizing nodes and edges connecting the nodes, wherein the nodes have properties and the edges have permissions;
providing a root node that has view, edit, manage edge permissions to all the nodes in the graph database;
storing data within the nodes;
defining a caller node, a source node, and a terminal node;
defining edge permissions to include view, edit, and manage, wherein
the view edge permission enables a first node to view the properties of a second node,
the edit edge permission enables the first node to edit the properties of the second node, and
the manage edge permission enables a caller node to create an edge between a source node and a terminal node provided the caller node has the view edge permission to the source node and the manage edge permission to the terminal node;
providing data stored within the second node to the first node in response to a data query from the first node to the second node wherein an edge between the first node and the second exists having a view permission, and changing the edges between the nodes is limited to control of the caller node having at least the view edge permission to the source node and the manage edge permission to the terminal node.

19. The method of claim 18, further comprising the step of:
enabling a new edge to be created between the source node and the terminal node pursuant to a request of the caller node wherein an edge having a view edge permission exists between the caller node and the source node, and an edge having a manage edge permission exists between the caller node and the terminal node.

20. The method of claim 18, wherein available edge permissions to add to the new edge between the source node and the terminal node are limited by a continuous edge permission path between the caller node and the terminal node.

21. The method of claim 18, further comprising the step of:
sending a delta, which contains data on changes in permissions or properties, to subscriber nodes.

22. A method for facilitating permissions within a graph database so as to enable a user of the graph database to construct and alter the graph database based upon edge permissions within the graph database, the method comprising the steps of:

providing a graph database utilizing nodes and edges connecting the nodes, wherein the nodes have properties and the edges have permissions;

providing a root node that has view, edit, manage edge permissions to all the nodes in the graph database;

storing data information within the nodes;

defining a caller node, a source node, and a terminal node;

defining edge permissions to include view, edit, and manage, wherein
the view edge permission enables a first node to view the properties of a second node,
the edit edge permission enables the first node to edit the properties of the second node, and
the manage edge permission enables a caller node to create an edge between a source node and a terminal node provided the caller node has the view edge permission to the source node and the manage edge permission to the terminal node; and editing data stored within the second node in response to an edit request from the first node to the second node wherein an edge between the first node and the second exists having an edit permission; and changing the edges between the nodes is limited to control of the caller node having at least the view edge permission to the source node and the manage edge permission to the terminal node.

* * * * *